US012807028B2

(12) United States Patent
Yumita et al.

(10) Patent No.: US 12,807,028 B2
(45) Date of Patent: Nov. 24, 2026

(54) MANAGEMENT APPARATUS AND MANAGEMENT METHOD FOR ADJUSTING ALLOCATION BETWEEN BOOKING TIME SLOTS AND FREE TIME SLOTS FOR ELECTRIC VEHICLE CHARGERS

(71) Applicant: TOYOTA JIDOSHA KABUSHIKI KAISHA, Toyota (JP)

(72) Inventors: Osamu Yumita, Seto (JP); Kuniaki Niimi, Toyota (JP); Keisuke Komori, Okazaki (JP); Masayoshi Suhama, Toyota (JP); Atsushi Inoue, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 432 days.

(21) Appl. No.: 18/488,584

(22) Filed: Oct. 17, 2023

(65) Prior Publication Data

US 2024/0190284 A1 Jun. 13, 2024

(30) Foreign Application Priority Data

Dec. 12, 2022 (JP) ................................ 2022-198074

(51) Int. Cl.
*B60L 53/60* (2019.01)
*B60L 53/62* (2019.01)
(Continued)

(52) U.S. Cl.
CPC ............. *B60L 53/665* (2019.02); *B60L 53/62* (2019.02); *B60L 53/67* (2019.02); *B60L 53/68* (2019.02);
(Continued)

(58) Field of Classification Search
CPC ........ B60L 53/665; B60L 53/67; B60L 53/68; B60L 53/62; B60L 2260/44; B60L 2260/58; B60L 53/60; G06Q 10/02
See application file for complete search history.

(56) References Cited

U.S. PATENT DOCUMENTS

2012/0200256 A1* 8/2012 Tse .......................... B60L 53/14 320/109
2013/0179383 A1* 7/2013 Pringle .................... G06N 7/01 320/109

(Continued)

FOREIGN PATENT DOCUMENTS

JP 2013137641 A 7/2013
WO 2013137071 A1 9/2013

OTHER PUBLICATIONS

Diaz, C., Ruiz, and Patino, "Smart Charge of an Electric Vehicles Station: A Model Predictive Control Approach," 2018 IEEE Conference on Control Technology and Applications (CCTA), Copenhagen, Denmark, 2018, pp. 54-59 (Year: 2018).*

*Primary Examiner* — Jeff Zimmerman
*Assistant Examiner* — Wayne S. Murray
(74) *Attorney, Agent, or Firm* — Hunton Andrews Kurth LLP

(57) ABSTRACT

A management apparatus manages charging of electrified vehicles with at least one charger. The management apparatus includes a processor programmed to adjust allocation between a booking time slot to book charging with the at least one charger and a free time slot to allow charging with the at least one charger without a booking.

20 Claims, 6 Drawing Sheets

(51) Int. Cl.
*B60L 53/66* (2019.01)
*B60L 53/67* (2019.01)
*B60L 53/68* (2019.01)

(52) U.S. Cl.
CPC ....... *B60L 2260/44* (2013.01); *B60L 2260/58* (2013.01)

(56) References Cited

U.S. PATENT DOCUMENTS

| | | | | |
|---|---|---|---|---|
| 2015/0046200 | A1 | 2/2015 | Chihara | |
| 2016/0358472 | A1* | 12/2016 | Bezak | G08G 1/133 |
| 2019/0009683 | A1* | 1/2019 | Saito | G06Q 10/06 |
| 2021/0213848 | A1* | 7/2021 | Sun | B60L 53/305 |
| 2022/0172129 | A1* | 6/2022 | Hou | B60L 53/63 |
| 2023/0182608 | A1* | 6/2023 | Suto | G06Q 50/06<br>320/137 |

* cited by examiner

FIG. 2

BEFORE ADJUSTMENT

| | EVSE21A | EVSE21B | EVSE21C | EVSE21D | EVSE21E |
|---|---|---|---|---|---|
| 12:00 ~12:30 | BOOKING TIME SLOT (BOOKED) | BOOKING TIME SLOT (BOOKED) | BOOKING TIME SLOT (NOT BOOKED) | FREE TIME SLOT | FREE TIME SLOT |
| 12:30 ~13:00 | BOOKING TIME SLOT (BOOKED) | BOOKING TIME SLOT (BOOKED) | BOOKING TIME SLOT (BOOKED) | FREE TIME SLOT | FREE TIME SLOT |
| 13:00 ~13:30 | BOOKING TIME SLOT (BOOKED) | BOOKING TIME SLOT (NOT BOOKED) | BOOKING TIME SLOT (NOT BOOKED) | FREE TIME SLOT | FREE TIME SLOT |
| 13:30 ~14:00 | BOOKING TIME SLOT (NOT BOOKED) | BOOKING TIME SLOT (NOT BOOKED) | BOOKING TIME SLOT (NOT BOOKED) | FREE TIME SLOT | FREE TIME SLOT |

AFTER ADJUSTMENT

| | EVSE21A | EVSE21B | EVSE21C | EVSE21D | EVSE21E |
|---|---|---|---|---|---|
| 12:00 ~12:30 | BOOKING TIME SLOT (BOOKED) | BOOKING TIME SLOT (BOOKED) | BOOKING TIME SLOT (NOT BOOKED) | FREE TIME SLOT | FREE TIME SLOT |
| 12:30 ~13:00 | BOOKING TIME SLOT (BOOKED) | BOOKING TIME SLOT (BOOKED) | BOOKING TIME SLOT (BOOKED) | BOOKING TIME SLOT | FREE TIME SLOT |
| 13:00 ~13:30 | BOOKING TIME SLOT (BOOKED) | BOOKING TIME SLOT (NOT BOOKED) | BOOKING TIME SLOT (NOT BOOKED) | FREE TIME SLOT | FREE TIME SLOT |
| 13:30 ~14:00 | BOOKING TIME SLOT (NOT BOOKED) | BOOKING TIME SLOT (NOT BOOKED) | BOOKING TIME SLOT (NOT BOOKED) | FREE TIME SLOT | FREE TIME SLOT |

FIG. 3

BEFORE ADJUSTMENT

| | EVSE21A | EVSE21B | EVSE21C | EVSE21D | EVSE21E |
|---|---|---|---|---|---|
| 12:00 ~12:30 | BOOKING TIME SLOT (BOOKED) | BOOKING TIME SLOT (BOOKED) | BOOKING TIME SLOT (NOT BOOKED) | FREE TIME SLOT | FREE TIME SLOT |
| 12:30 ~13:00 | BOOKING TIME SLOT (BOOKED) | BOOKING TIME SLOT (NOT BOOKED) | BOOKING TIME SLOT (NOT BOOKED) | FREE TIME SLOT | FREE TIME SLOT |

CURRENT: BUSY
12:30 TO 13:00: CONGESTION ESTIMATED
(DEGREE OF CONGESTION IS HIGH)

AFTER ADJUSTMENT

| | EVSE21A | EVSE21B | EVSE21C | EVSE21D | EVSE21E |
|---|---|---|---|---|---|
| 12:00 ~12:30 | BOOKING TIME SLOT (BOOKED) | BOOKING TIME SLOT (BOOKED) | FREE TIME SLOT | FREE TIME SLOT | FREE TIME SLOT |
| 12:30 ~13:00 | BOOKING TIME SLOT (BOOKED) | FREE TIME SLOT | FREE TIME SLOT | FREE TIME SLOT | FREE TIME SLOT |

FIG. 4

| | CHARGING CAPACITY [kW] | SOC[%] | REMAINING AMOUNT OF ELECTRIC POWER LOWER THAN OR EQUAL TO 30 kW |
|---|---|---|---|
| VEHICLE A | 60 | 60 | × |
| VEHICLE B | 50 | 50 | ○ |
| VEHICLE C | 40 | 80 | × |
| VEHICLE D | 30 | 90 | ○ |

MANAGEMENT APPARATUS AND MANAGEMENT METHOD FOR ADJUSTING ALLOCATION BETWEEN BOOKING TIME SLOTS AND FREE TIME SLOTS FOR ELECTRIC VEHICLE CHARGERS

CROSS-REFERENCE TO RELATED APPLICATION

This application claims priority to Japanese Patent Application No. 2022-198074 filed on Dec. 12, 2022, incorporated herein by reference in its entirety.

BACKGROUND

1. Technical Field

The disclosure relates to a management apparatus and a management method.

2. Description of Related Art

WO 2013/137071 describes a system in which an electrified vehicle is charged based on a booking to use a charger.

SUMMARY

With the system described in WO 2013/137071, when, for example, there are a small number of available booking time slots, it is presumable that the number of vehicles not allowed to be charged increases. For this reason, it is difficult to improve the degree of capacity utilization of the charger.

The disclosure provides a management apparatus and a management method that are capable of easily improving the degree of capacity utilization of a charger.

A first aspect of the disclosure provides a management apparatus that manages charging of electrified vehicles with at least one charger. The management apparatus includes a processor programmed to adjust allocation between a booking time slot to book charging with the at least one charger and a free time slot to allow charging with the at least one charger without a booking.

With the management apparatus according to the first aspect of the disclosure, as described above, allocation between a booking time slot to book charging with the at least one charger and a free time slot to allow charging with the at least one charger without a booking is adjusted. Thus, it is possible to easily adjust the number of electrified vehicles that freely perform charging without a booking and the number of electrified vehicles that reliably perform charging in a booking period. As a result, it is possible to easily improve the degree of capacity utilization of the charger.

In the management apparatus according to the first aspect, the processor may be programmed to adjust the allocation based on at least one of information on a busy status of the at least one charger, or information on a booking status of the at least one charger. With this configuration, it is possible to adjust as needed the degree of capacity utilization of the charger according to at least one of the busy status and the booking status of the charger.

In this case, the processor may be programmed to, when the number of the electrified vehicles booked in a predetermined booking period is greater than a predetermined number, increase allocation of the booking time slot in the predetermined booking period. With this configuration, it is possible to increase the booking time slot when there are a relatively large number of bookings for the charger.

In the management apparatus that adjusts the allocation based on the busy status of the charger, the processor may be programmed to, when the processor determines that the at least one charger is busy in a predetermined period based on the information on the busy status, increase allocation of the free time slot in the predetermined period. With this configuration, it is possible to increase the free time slot when the degree of congestion of the charger is relatively high. As a result, it is possible to suppress an increase in the degree of congestion of the charger.

In the management apparatus that adjusts the allocation based on the busy status of the charger, the information on the busy status may be the number of the electrified vehicles in queue to use the at least one charger, and the processor may be programmed to determine a current busy status of the at least one charger based on the number of the electrified vehicles in queue, and adjust the current allocation based on the current busy status. With this configuration, it is possible to easily adjust the current degree of congestion of the charger. In addition, it is possible to easily improve the busy status of the charger by adjusting the allocation based on the number of electrified vehicles in queue to use the charger (a scheduled number of electrified vehicles that use the charger).

In the management apparatus that adjusts the allocation based on the busy status of the charger, the processor may be programmed to determine a busy status of the at least one charger after a predetermined period of time based on vehicle information on the electrified vehicles, and adjust the allocation after the predetermined period of time based on the busy status after the predetermined period of time. With this configuration, it is possible to easily adjust the degree of congestion of the charger after the predetermined period of time.

In this case, the vehicle information may include information on the number of the electrified vehicles located within a predetermined range with reference to the at least one charger. With this configuration, it is possible to easily predict the degree of congestion of the charger based on the number of electrified vehicles located within the predetermined range.

In the management apparatus that adjusts the allocation based on the busy status after the predetermined period of time, the vehicle information may include information on at least one of an SOC or a charging capacity. The SOC and the charging capacity are acquired from each of the electrified vehicles associated with the at least one charger. With this configuration, it is possible to easily learn a period of time required to charge each of the electrified vehicles based on at least one of the SOC and the charging capacity. The SOC and the charging capacity are acquired from each of the electrified vehicles associated with the charger. As a result, it is possible to easily predict the degree of congestion of the charger.

The management apparatus that adjusts the allocation based on the busy status after the predetermined period of time may further include a memory storing a vehicle number estimation model. The vehicle number estimation model may be a trained model that uses the vehicle information as an input and that uses the number of the electrified vehicles that use the at least one charger as an output. The processor may be programmed to determine the busy status after the predetermined period of time based on the vehicle number estimation model and the vehicle information. With this configuration, it is possible to further accurately determine the busy status after the predetermined period of time by using the trained model.

In the management apparatus according to the first aspect, the processor may be programmed to control the at least one charger such that a charge mode for the booking time slot and a charge mode for the free time slot are respectively one and the other of quick charge and low-rate charge lower in rate of charge than the quick charge. With this configuration, it is possible to easily adjust the rate of charge in the booking time slot and the rate of charge in the free time slot.

In this case, the processor may be programmed to control the at least one charger such that a charge mode for a charger changed from the free time slot to the booking time slot is set to the low-rate charge and a charge mode for a charger changed from the booking time slot to the free time slot is set to the quick charge.

In the management apparatus according to the first aspect, the at least one charger may include a plurality of chargers. The processor may be programmed to adjust allocation of the plurality of chargers between the number of chargers for the free time slot and the number of chargers for the booking time slot. With this configuration, it is possible to easily improve the degree of capacity utilization of all the plurality of chargers.

The management apparatus that adjusts the allocation based on the busy status of the charger may further include a communication unit configured to acquire the information on the busy status of the at least one charger and the information on the booking status of the at least one charger.

In this case, the communication unit may be configured to acquire information on the number of the electrified vehicles in queue by acquiring an image from a camera installed around the charger.

A second aspect of the disclosure provides a management method that manages charging of electrified vehicles with at least one charger. The management method includes adjusting allocation between a booking time slot to book charging with the at least one charger and a free time slot to allow charging with the at least one charger without a booking.

With the management method according to the second aspect of the disclosure, as described above, allocation between a booking time slot to book charging with the at least one charger and a free time slot to allow charging with the at least one charger without a booking is adjusted. Thus, it is possible to provide the management method capable of easily improving the degree of capacity utilization of the charger.

According to the aspects of the disclosure, it is possible to easily improve the degree of capacity utilization of the charger.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a view that shows an example in which booking time slots for EVSEs are increased according to the embodiment;

FIG. 3 is a view that shows an example in which free time slots for EVSEs are increased according to the embodiment;

FIG. 4 is a table that shows a remaining amount of electric power based on the charging capacity and the SOC of an electrified vehicle;

DETAILED DESCRIPTION OF EMBODIMENTS

Figure 1:
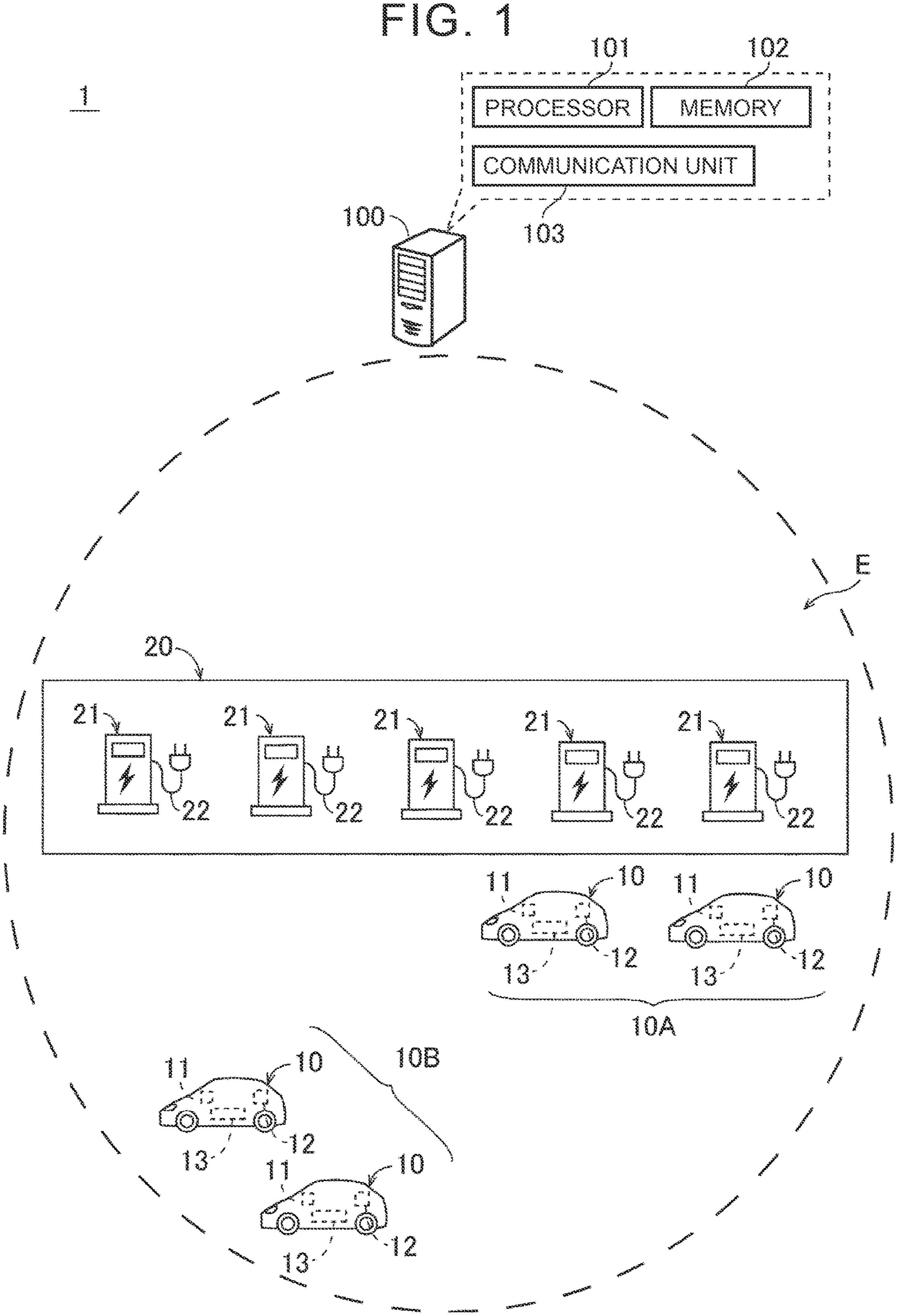
FIG. 1 is a diagram that shows the configuration of a system according to an embodiment.

Hereinafter, an embodiment of the disclosure will be described in detail with reference to the accompanying drawings. Like reference signs denote the same or corresponding portions in the drawings, and the description thereof will not be repeated.

FIG. 1 is a diagram that shows the configuration of a system 1 according to the present embodiment. The system 1 includes a server 100, electrified vehicles 10, and a charging system 20. The charging system 20 includes a plurality of (five in the present embodiment) electric vehicle supply equipments (EVSEs) 21. Hereinafter, the five EVSEs 21 may be referred to as EVSEs 21A, 21B, 21C, 21D, 21E. The server 100 is an example of the management apparatus according to the aspect of the disclosure. The number of the EVSEs 21 in the charging system 20 is not limited to the above example.

For example, each of the EVSEs 21A, 21B, 21C is an EVSE that will be available by booking. Each of the EVSEs 21D, 21E is an EVSE that is freely available without a booking.

A charge mode of each of the EVSEs 21A, 21B, 21C is initially set to a standard charge mode. A charge mode of each of the EVSEs 21D, 21E is initially set to a quick charge mode. Each of the EVSEs 21A, 21B, 21C, 21D, 21E is configured such that the charge mode is allowed to be changed by changing a program. Standard charge is an example of the low-rate charge according to the aspect of the disclosure.

Examples of the electrified vehicle 10 include a plug-in hybrid electric vehicle (PHEV), a battery electric vehicle (BEV), and a fuel cell electric vehicle (FCEV).

The electrified vehicle 10 includes a navigation system 11 and a communication instrument 12. The electrified vehicle 10 includes a battery 13 that supplies electric power to electrical devices such as the navigation system 11 and the communication instrument 12. The communication instrument 12 may include a data communication module (DCM) or may include a communication I/F that supports a fifth generation mobile communication system (5G).

The EVSE 21 means a vehicle power supply equipment. The electrified vehicle 10 is configured to be electrically connectable with the EVSE 21. When, for example, a charging cable 22 connected to the EVSE 21 is connected to an inlet of the electrified vehicle 10, electric power is supplied from the EVSE 21 to the electrified vehicle 10.

The server 100 is an apparatus that manages charging of the electrified vehicles 10 with the five EVSEs 21 of the charging system 20. For example, the server 100 manages the schedule of charging of the electrified vehicles 10 with the EVSEs 21.

The server 100 is configured to manage information on the electrified vehicles 10 registered (hereinafter, also referred to as vehicle information), information on users registered (hereinafter, also referred to as user information), and information on the EVSEs 21 registered (hereinafter, also referred to as EVSE information). The user information, the vehicle information, and the EVSE information are identified with identification information (ID) and stored in a memory 102 (described later).

A user ID is identification information for identifying a user and also functions as information (terminal ID) that identifies a mobile terminal 14 carried by the user. The server 100 is configured to save information received from the mobile terminal 14 user ID by user ID. The user information includes a communication address of a mobile terminal 14 carried by a user, and a vehicle ID of an electrified vehicle 10 that belongs to the user.

A vehicle ID is identification information for identifying an electrified vehicle 10. The vehicle ID may be a license plate or may be a vehicle identification number (VIN). The vehicle information includes an activity schedule of each electrified vehicle 10.

An EVSE-ID is identification information for identifying an EVSE 21. The EVSE information includes the communication address of each EVSE 21 and a state of an electrified vehicle 10 connected to the EVSE 21. The EVSE information also includes information indicating a combination of an electrified vehicle 10 and an EVSE 21 connected to each other (for example, a combination of an EVSE-ID and a vehicle ID).

The server 100 includes a processor 101, the memory 102, and a communication unit 103. The processor 101 is an example of the processor according to the aspect of the disclosure.

The memory 102 stores not only a program to be run on the processor 101 but also information to be used by the program (for example, maps, mathematical expressions, and various parameters).

The memory 102 stores information on the mode of use of each of the EVSEs 21. Specifically, as shown in FIG. 2, the memory 102 stores a use schedule of each of the EVSEs 21. The use schedule shows that a use time slot of every 30 minutes for each of the EVSEs 21 corresponds to any one of a booking time slot and a free time slot. A booking time slot is a time slot available for the user of the electrified vehicle 10 with a booking for charging at the EVSE 21 to use the EVSE 21. A free time slot is a time slot available for anyone to perform charging at the EVSE 21 without a booking. Time slots of the EVSE 21 do not need to be set every 30 minutes. For example, time slots of the EVSE 21 may be set every hour.

The communication unit 103 includes various communication I/Fs. The processor 101 controls the communication unit 103. Specifically, the processor 101 communicates with each of the communication instruments 12 (or mobile terminals 14) of the electrified vehicles 10 and the EVSEs 21 through the communication unit 103.

The communication unit 103 acquires information on a status of use of each of the EVSEs 21 (charging system 20).

Specifically, the communication unit 103 acquires (receives) information on a booking status of each of the EVSEs 21 (charging system 20).

More specifically, the communication unit 103 communicates with the electrified vehicle 10 or the mobile terminal 14 to receive information indicating that the user of the electrified vehicle 10 is scheduled to use a booking time slot of the EVSE 21 (booking information). Then, the processor 101 updates the use schedule (see FIG. 2) of the charging system 20, stored in the memory 102, based on the booking information. Specifically, the processor 101 updates the status of the booking time slot booked by the user from the status “Not Booked” to the status “Booked”. The booking information is an example of the information on a booking status according to the aspect of the disclosure. The communication unit 103 may receive the booking information from the charging system 20.

The processor 101 controls the EVSE 21 such that only the electrified vehicle 10 with a booking in a booking time slot is allowed to be charged in the booking time slot. For example, the processor 101 controls the EVSE 21 such that charging is not started even when an electrified vehicle 10 other than the electrified vehicle 10 with a booking is connected to the EVSE 21. Also, the processor 101 may restrict an electrified vehicle 10 without a booking from being charged by controlling a fence (not shown) for stopping use of the EVSE 21 (entry into a charging area) by the electrified vehicle 10 without a booking.

The communication unit 103 acquires (receives) information on a busy status of the EVSEs 21 (charging system 20). The busy status varies depending on the number of electrified vehicles 10 that are likely to use the EVSEs 21 without a booking (use free time slots) in each time period.

Specifically, the communication unit 103 acquires information on the number of electrified vehicles 10 (see a vehicle group 10A in FIG. 1) in queue to use the EVSEs 21 (charging system 20). For example, the communication unit 103 acquires information on the number of electrified vehicles 10 in queue by acquiring (receiving) an image from a camera (not shown) installed around the charging system 20. The information on the number is an example of the information on a busy status according to the aspect of the disclosure.

The processor 101 determines a current busy status of the EVSEs 21 (charging system 20) base on the number of electrified vehicles 10 in queue to use the EVSEs 21 (charging system 20). The current busy status means a busy status in a time period including current time. A time period in which the EVSE 21 is used can extend to the next time period depending on the number of electrified vehicles 10 in queue. In this case, the processor 101 may also determine a busy status in the next and following time periods in which the EVSE 21 is predicted to be used.

The communication unit 103 acquires information on the number of electrified vehicles 10 (see the electrified vehicle 10B in FIG. 1) located within a predetermined range E with reference to the EVSEs 21 (charging system 20) by acquiring (receiving) global positioning system (GPS) information from the electrified vehicles 10. Also, the communication unit 103 may acquire information on the number of electrified vehicles 10 located within the predetermined range E by acquiring (receiving) an image from a camera (not shown) installed around the charging system 20 and capable of capturing an image within the predetermined range E. The predetermined range E is, for example, a range within a radius R (for example, 1 km) from the charging system 20. The predetermined range E may be a region or the like in which a road in front of the charging system 20 is provided. The information on the number of electrified vehicles 10 located within the predetermined range E is an example of the information on a busy status according to the aspect of the disclosure. The GPS information of the electrified vehicles 10 located within the predetermined range E is an example of the vehicle information according to the aspect of the disclosure.

The processor 101 estimates the number of electrified vehicles 10 that use the EVSEs 21 (charging system 20) after a predetermined period of time (for example, 30 minutes later) based on the number of electrified vehicles 10 located within the predetermined range E. Specifically, the processor 101 performs the estimation by using a trained model (described later). The processor 101 may estimate time periods in which the charging system 20 is used based on the locations of the electrified vehicles 10 within the predetermined range E, an activity history (activity schedule) of each of the electrified vehicles 10, and the like, and predict the number of EVSEs 21 (charging system 20) used in each time period based on the time periods predicted.

The communication unit 103 acquires information on a state of charge (SOC) and a charging capacity (see FIG. 4) of each of the electrified vehicles 10 associated with the EVSEs 21 (charging system 20). The communication unit 103 may acquire vehicle type information of each of the electrified vehicles 10, instead of the charging capacity. In this case, the processor 101 may estimate the charging capacity of each of the electrified vehicles 10 based on the vehicle type information. The electrified vehicles 10 associated with the EVSEs 21 (charging system 20) mean the electrified vehicles 10 registered in the server 100. The information on the SOC and the charging capacity of each of the electrified vehicles 10 is an example of the vehicle information according to the aspect of the disclosure.

The processor 101 estimates the number of electrified vehicles 10 that use the EVSEs 21 (charging system 20) after a predetermined period of time (for example, 30 minutes later) based on the SOC and the charging capacity of each of the electrified vehicles 10. Specifically, the processor 101 performs the estimation by using a trained model (described later). For example, the processor 101 performs the estimation based on the number of electrified vehicles 10 of which the remaining amount of electric power calculated based on the SOC and the charging capacity of the electrified vehicle 10 is lower than or equal to 30 kW. The processor 101 may predict time periods in which the charging system 20 is used based on not only the remaining amount of electric power of each of the electrified vehicles 10 but also the location of each of the electrified vehicles 10, the activity history (activity schedule) of each of the electrified vehicles 10, and the like. In this case, based on the time periods predicted, the processor 101 may predict the number of EVSEs 21 (charging system 20) used in each time period. The threshold 30 kW is only an example, and another threshold may be used.

The trained model will be described with reference to FIG. 5. The processor 101 predicts the number of electrified vehicles 10 that use the charging system 20 after a predetermined period of time (for example, 30 minutes later) based on the number of electrified vehicles 10 located within the predetermined range E or the number of electrified vehicles 10 of which the remaining amount of electric power is lower than or equal to 30 kW. For example, a trained model generated by a technology of machine learning, such as deep learning, may be used for the prediction process.

Figure 5:
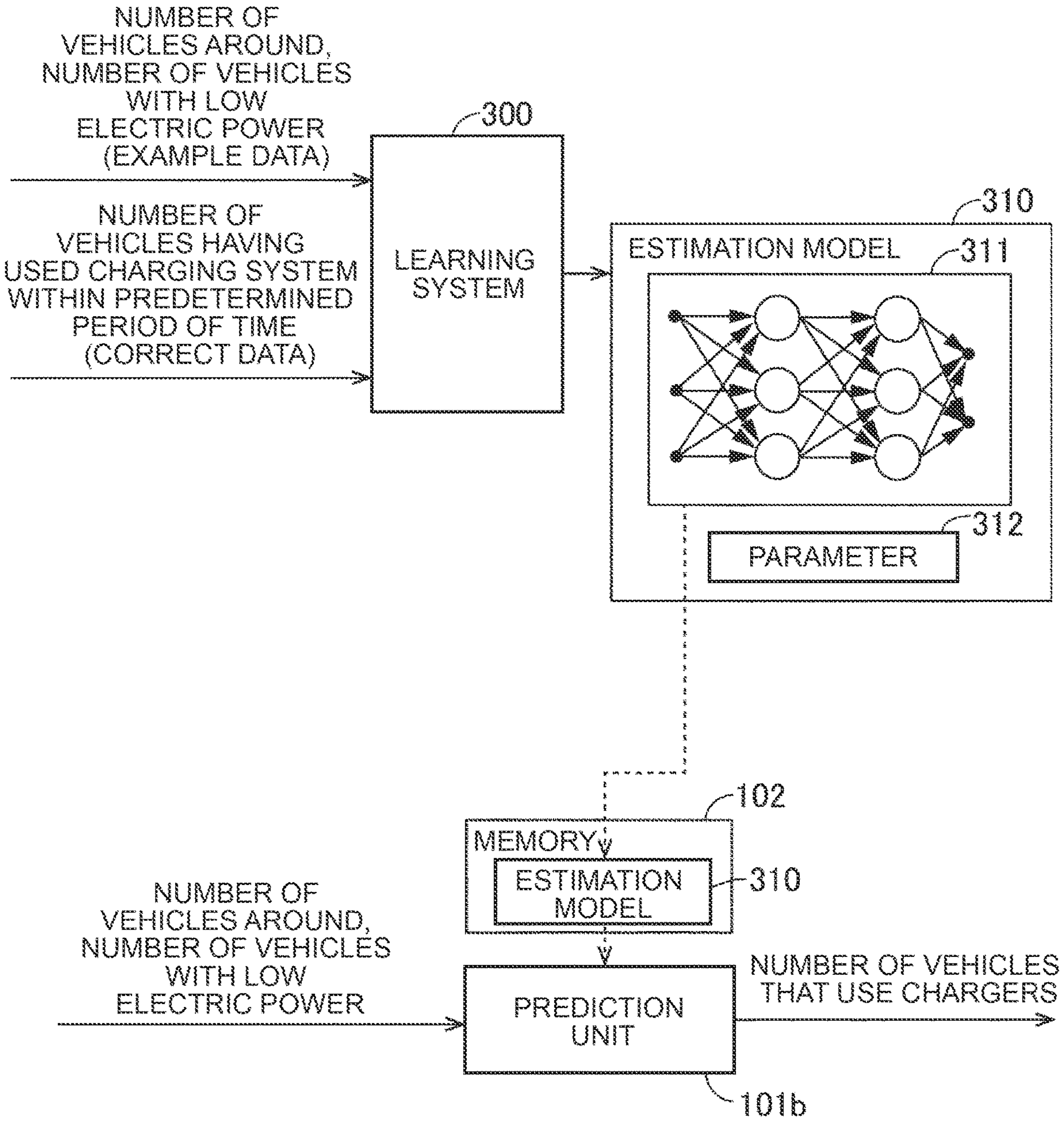
FIG. 5 is a view that shows an estimation model that estimates the busy status of an EVSE according to the embodiment.

FIG. 5 is a diagram for illustrating an example of the trained model used for the prediction. An estimation model 310 that is a yet-to-be trained model includes, for example, a neural network 311 and a parameter 312. The neural network 311 is a known neural network used in a process through deep learning. Examples of such a neural network include a convolutional neural network (CNN) and a recurrent neural network (RNN). The parameter 312 includes weighting coefficients and the like used in calculation by the neural network 311. The estimation model 310 is an example of the vehicle number estimation model according to the aspect of the disclosure.

A large number of pieces of training data is prepared in advance by a developer. The training data includes example data and correct data. The example data includes data on the number of electrified vehicles 10 located within the predetermined range E and data on the number of electrified vehicles 10 of which the remaining amount of electric power is lower than or equal to 30 kW. The correct data includes data on the number of electrified vehicles 10 having used the charging system 20 within a predetermined period of time (for example, 30 minutes), of the electrified vehicles 10 located within the predetermined range E, and data on the number of electrified vehicles 10 having used the charging system 20 within a predetermined period of time (for example, 30 minutes), of the electrified vehicles 10 of which the remaining amount of electric power is lower than or equal to 30 kW. A learning system 300 trains the estimation model 310 by using the example data and the correct data. The learning system 300 may train a plurality of estimation models by using a plurality of pieces of correct data that are different in the predetermined period of time from each other. Thus, it is possible to predict busy statuses respectively in a plurality of time periods.

As described above, the estimation model 310 is trained, and the estimation model 310 having been trained is stored in the memory 102. The processor 101 outputs the number of electrified vehicles 10 that use the charging system 20 within a predetermined period of time (30 minutes in the present embodiment) based on the estimation model 310 and the number of electrified vehicles 10 located within the predetermined range E (or the number of electrified vehicles 10 of which the remaining amount of electric power is lower than or equal to 30 kW). Thus, the prediction is performed. Even after the estimation model 310 is stored in the memory 102, training of the estimation model 310 may be continued. In FIG. 5, for the sake of simplification, an estimation model that uses the number of electrified vehicles 10 located within the predetermined range E as input data and an estimation model that uses the number of electrified vehicles 10 of which the remaining amount of electric power is lower than or equal to 30 kW as input data both are illustrated as the estimation model 310 together; however, actually, different estimation models are used.

Here, in an existing system, it is presumable that the number of vehicles that are not allowed to be charged increases when, for example, there are an excessively small number of free time slots for the number of vehicles that desire to perform charging or there are a small number of available booking time slots. For this reason, it is difficult to improve the degree of capacity utilization of the chargers.

In the present embodiment, the processor 101 adjusts allocation (proportion, ratio) between free time slots and booking time slots based on information on the booking status and information on the busy status. In other words, the processor 101 adjusts allocation between free time slots and booking time slots based on the busy status and the booking status of the charging system 20.

Specifically, when the number of the electrified vehicles 10 booked in a predetermined booking period is greater than a predetermined number, the processor 101 increases allocation of booking time slots in the predetermined booking period. More specifically, as shown in FIG. 2, the processor 101 increases allocation of booking time slots in a time period in which all the booking time slots are booked. In the example shown in FIG. 2, all the booking time slots in the time period of 12:30 to 13:00 are booked. Therefore, the processor 101 changes the mode of use of the EVSE 21D in 12:30 to 13:00 from the free time slot to a booking time slot.

Alternatively, the free time slot of the EVSE 21E may be changed to a booking time slot or both the free time slot of the EVSE 21D and the free time slot of the EVSE 21E may be changed to booking time slots.

A method of adjusting allocation between booking time slots and free time slots based on the number of electrified vehicles 10 booked is not limited to the above example. For example, allocation of booking time slots may be increased in a time period in which the number of electrified vehicles 10 booked is greater than a predetermined fixed value (for example, two). Also, allocation of booking time slots in a time period in which the proportion of the number of booking time slots booked with respect to the total number of booking time slots is higher than a predetermined value may be increased.

When the processor 101 determines that the EVSEs 21 (charging system 20) are busy in a predetermined period, the processor 101 increases allocation of free time slots in the predetermined period.

Specifically, the processor 101 determines a current busy status of the charging system 20 based on the number of electrified vehicles 10 in queue to use the EVSEs 21 (charging system 20).

More specifically, when the number of electrified vehicles 10 in queue to use the EVSEs 21 (charging system 20) is greater than a predetermined number, the processor 101 changes booking time slot not booked in a current time period to free time slots. The processor 101 may increase the number of free time slots to be increased as the number of electrified vehicles 10 in queue increases. Specifically, the processor 101 may increase the number of free time slots by one when one to three electrified vehicles 10 are in queue and increase free time slots by two when four to six electrified vehicles 10 are in queue. In the example shown in FIG. 3, the mode of use of the EVSE 21C in 12:00 to 12:30 that is a current time period is changed from the booking time slot (not booked) to a free time slot.

The processor 101 determines the busy status of the charging system 20 based on the number of electrified vehicles 10 estimated based on the number (hereinafter, first number) of electrified vehicles 10 located within the predetermined range E and the trained model and the number of electrified vehicles 10 estimated based on the number (hereinafter, second number) of electrified vehicles 10 of which the remaining amount of electric power is lower than or equal to 30 kW and the trained model.

When, for example, a total value of the first number and the second number is greater than a predetermined number, the processor 101 changes booking time slots not booked in the next time period (12:30 to 13:00 in FIG. 3) to free time slots. The number of free time slots increased may be the same as the adjustment method based on the number of electrified vehicles 10 in queue. FIG. 3 shows an example in which two booking time slots in 12:30 to 13:00 are changed to free time slots. As described above, a time period in which allocation between free time slots and booking time slots is adjusted may be determined based on the locations, activity histories (activity schedules), and the like of the electrified vehicles 10. Weights may be varied between the first number and the second number.

In determining the busy status, a time period, a day of week, weather, an event held around the charging system 20, or the like may be taken into consideration. For example, information indicating that the frequency of use of the charging system 20 by a predetermined vehicle type on a predetermined day of week is high (or low) may be included in the estimation model 310.

Control Sequence

Figure 6:
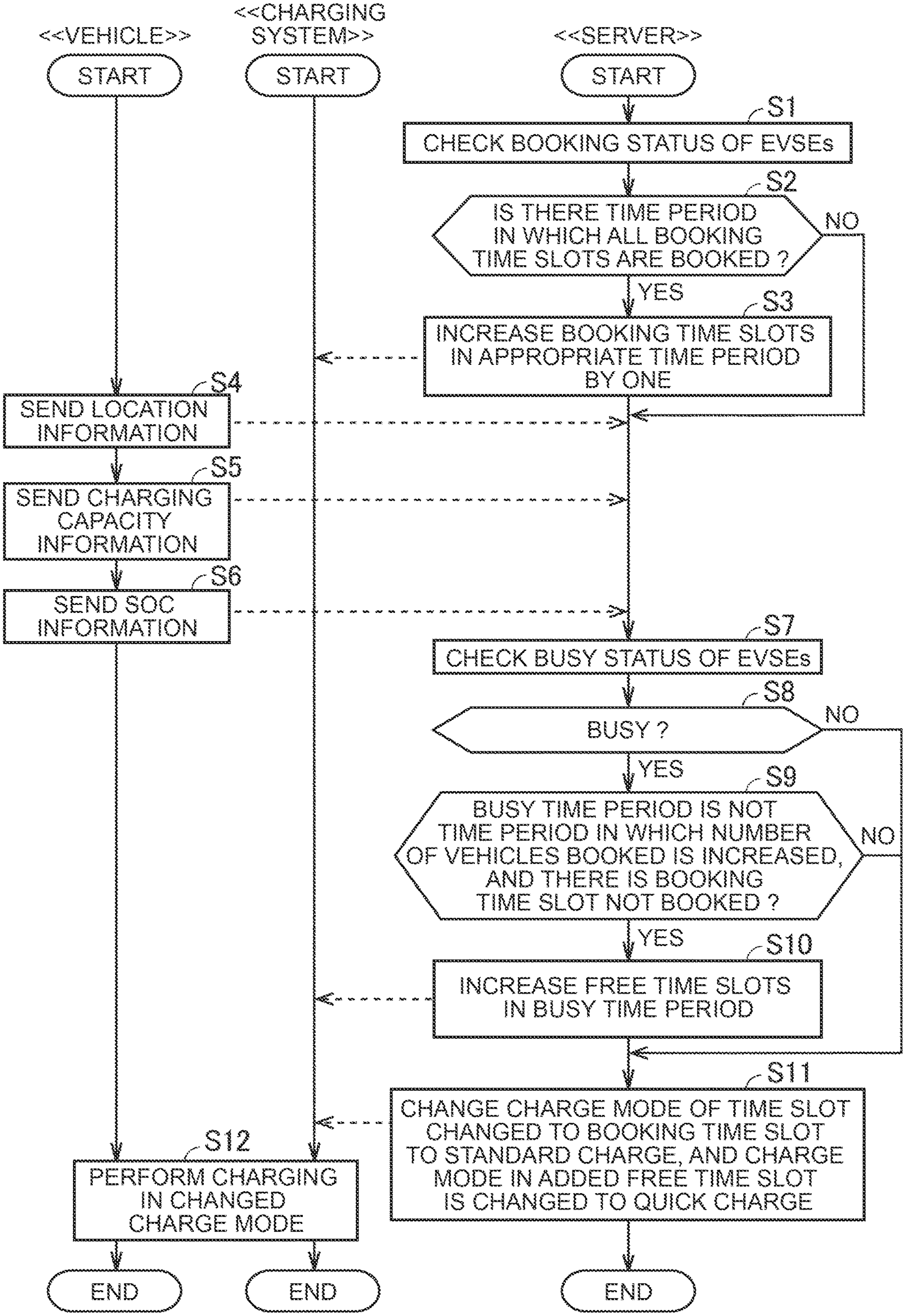
FIG. 6 is a sequence diagram that shows a method of adjusting booking time slots and free time slots for EVSEs according to the embodiment.

Next, an example of a control sequence with the system 1 will be described with reference to FIG. 6. The control sequence according to the aspect of the disclosure is not limited to the following example.

In step S1, the server 100 (processor 101) checks the booking status of the EVSEs 21 (charging system 20).

In step S2, the processor 101 determines whether there is a time period in which all the booking time slots are booked. When there is a time period in which all the booking time slots are booked (Yes in S2), the process proceeds to step S3. When there is no time period in which all the booking time slots are booked (No in S2), the process proceeds to step S4.

In step S3, the processor 101 executes a process of increasing booking time slots by one by changing the free time slot in the time period in which all the booking time slots are booked, to a booking time slot.

In step S4, the electrified vehicle 10 or the mobile terminal 14 sends location information of the electrified vehicle 10 to the communication unit 103 of the server 100.

In step S5, the electrified vehicle 10 or the mobile terminal 14 sends information on the charging capacity of the electrified vehicle 10 to the communication unit 103 of the server 100.

In step S6, the electrified vehicle 10 or the mobile terminal 14 sends information on the SOC of the electrified vehicle 10 to the communication unit 103 of the server 100.

The processes of step S4, step S5, and step S6 may be performed, for example, before step S1. The order in which the processes of step S4, step S5, and step S6 is not limited to the example.

In step S7, the processor 101 checks the busy status of the EVSEs 21 (charging system 20) based on the information acquired through the processes of step S4, step S5, and step S6.

In step S8, the processor 101 determines whether the EVSEs 21 (charging system 20) are busy. The example in which whether the time period subsequent to the current time period is busy is determined has been described above; however, the disclosure is not limited thereto. The busy status of the next and the following time periods may be determined. A method of determining the busy status is as described above, so the description will not be repeated. When the EVSEs 21 (charging system 20) are busy (Yes in S8), the process proceeds to step S9. When the EVSEs 21 (charging system 20) are not busy (No in S8), the process proceeds to step S11.

In step S9, the processor 101 determines whether the time period (next time period) determined to be busy in step S8 is not the time period in which the booking time slots are increased in step S3 and is a time period in which there is a booking time slot not booked. When the determination is affirmative in step S9, the process proceeds to step S10. When the determination is negative in step S9, the process proceeds to step S11.

In step S10, the processor 101 increases the number of free time slots by changing booking time slots not booked in a busy time period (the next time period in the present embodiment) to free time slots. Therefore, in the process of step S9, an increase in booking time slot is given a higher priority than an increase in free time slot. An increase in free time slot may be given a higher priority than an increase in booking time slot by not increasing booking time slots in a time period in which free time slots are increased.

In step S11, the processor 101 controls the EVSEs 21 such that the charge mode of the EVSE 21 changed from the free time slot to the booking time slot is changed from the quick charge mode to the standard charge mode. The processor 101 controls the EVSEs 21 such that the charge mode of the EVSE 21 changed from the booking time slot to the free time slot is changed from the standard charge mode to the quick charge mode.

In step S12, in a time period in which the proportion between booking time slots and free time slots is changed, charging based on the charge mode changed in step S11 is performed.

As described above, in the present embodiment, the processor 101 adjusts allocation between booking time slots and free time slots in the EVSEs 21 based on the booking status and the busy status of the EVSEs 21. Thus, it is possible to adjust the allocation based on the ratio between the electrified vehicles 10 that use the EVSEs 21 with a booking and the electrified vehicles 10 that use the EVSEs 21 without a booking. As a result, the users of the electrified vehicles 10 are allowed to more easily use the EVSEs 21. Thus, it is possible to easily improve the degree of capacity utilization of the EVSEs 21.

In the above-described embodiment, an example in which allocation between booking time slots and free time slots in the EVSEs 21 is adjusted has been described; however, the disclosure is not limited thereto. Allocation between booking time slots and free time slots in one EVSE 21 may be adjusted.

Figure 7:
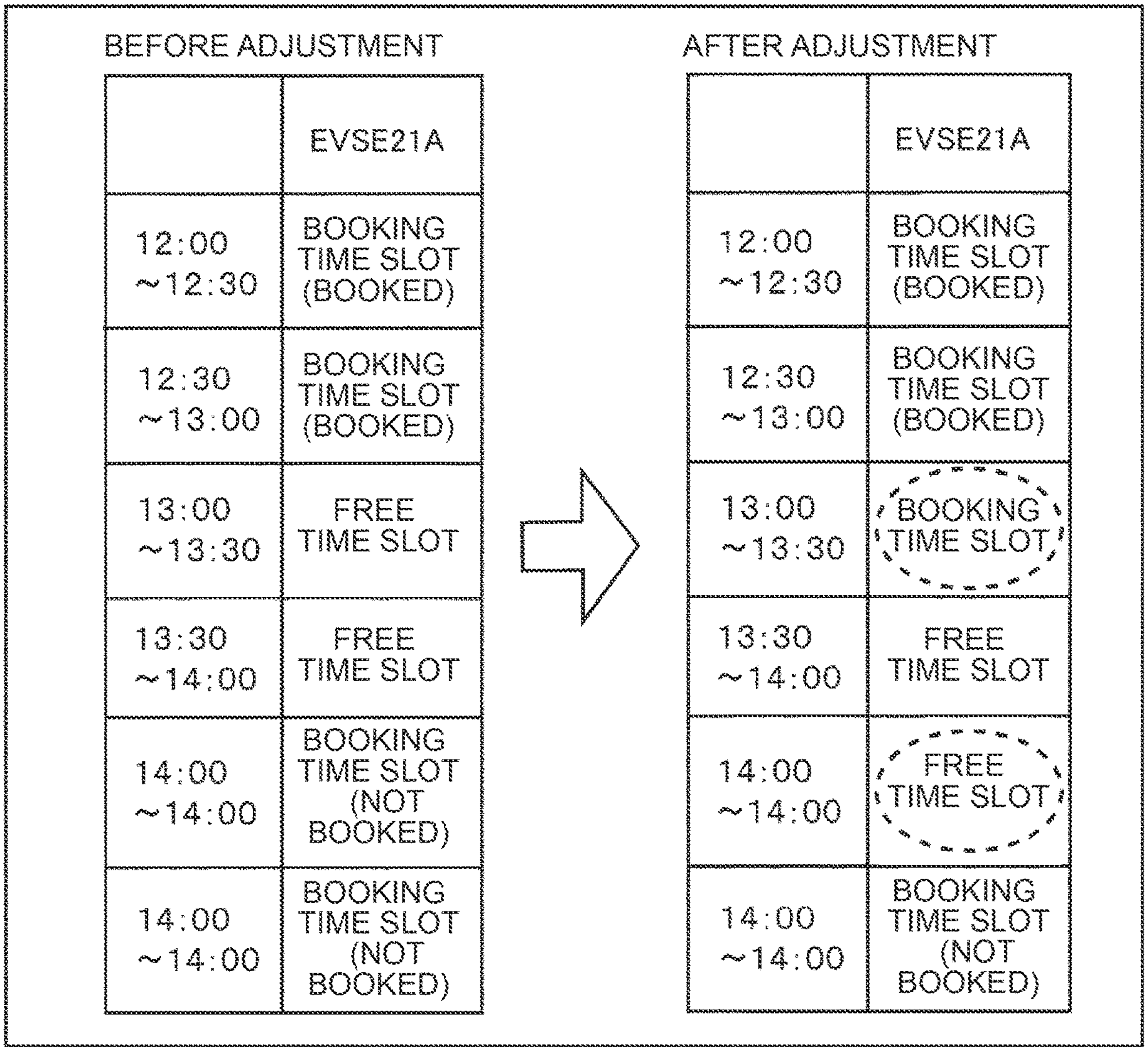
FIG. 7 is a view that shows an example in which booking time slots and free time slots for EVSEs are adjusted according to a modification of the embodiment.

Specifically, as shown in FIG. 7, when the number of electrified vehicles 10 booked (for example, the number of electrified vehicles 10 booked in a day) in the EVSE 21 (for example, EVSE 21A) is greater than or equal to a predetermined number, free time slots in the EVSE 21A are changed to booking time slots. When the time slot corresponding to a time period estimated to be busy in the EVSE 21A is a booking time slot not booked, the time slot corresponding to the time period in the EVSE 21A is changed from the booking time slot to a free time slot.

In the above-described embodiment, an example in which allocation between booking time slots and free time slots is adjusted based on both the booking status and the busy status of the EVSEs 21 has been described; however, the disclosure is not limited thereto. The adjustment may be performed based on only any one of the booking status and the busy status of the EVSEs 21. The adjustment may be performed, for example, randomly at selected timing not based on any of the booking status and the busy status of the EVSEs 21.

In the above-described embodiment, an example in which allocation of booking time slots in a predetermined booking period is increased when the number of electrified vehicles 10 booked in the predetermined booking period is greater than a predetermined number has been described; however, the disclosure is not limited thereto. In the above case, allocation of booking time slots in the predetermined booking period may be reduced. Alternatively, allocation of free time slots in the predetermined booking period may be adjusted (for example, increased) when the number of electrified vehicles 10 booked in a predetermined booking period is less than a predetermined number.

In the above-described embodiment, an example in which allocation of free time slots in a predetermined period is increased when the EVSEs 21 are busy in the predetermined period has been described; however, the disclosure is not limited thereto. In the above case, allocation of free time slots in the predetermined period may be reduced. Alternatively, allocation of booking time slots in a predetermined period may be adjusted (for example, increased) when the EVSEs 21 in the predetermined period are determined to be not busy.

In the above-described embodiment, an example in which the busy status of the EVSEs 21 is determined based on four pieces of information, that is, the number of electrified vehicles 10 in queue to use the EVSEs 21, the number of electrified vehicles 10 located within the predetermined range E, the SOC of each of the electrified vehicles 10, and the charging capacity of each of the electrified vehicles 10, has been described; however, the disclosure is not limited thereto. The busy status of the EVSEs 21 may be determined based on any one or two or three of the four pieces of information.

In the above-described embodiment, an example in which the busy status of the EVSEs 21 in a current time period is determined based on only the number of electrified vehicles 10 in queue to use the EVSEs 21 has been described; however, the disclosure is not limited thereto. For example, the busy status of the EVSEs 21 in a current time period may be determined based on not only the number of electrified vehicles 10 in queue but also vehicle type information (charging capacity information) of each of the electrified vehicles 10 in queue.

In the above-described embodiment, an example in which the busy status of the EVSEs 21 is determined by using the estimation model 310 has been described; however, the disclosure is not limited thereto. The busy status of the EVSEs 21 may be determined without using the estimation model 310. Alternatively, the busy status of the EVSEs 21 may be determined by using only any one of the number of electrified vehicles 10 within the predetermined range E and the number of electrified vehicles 10 of which the remaining amount of electric power is lower than or equal to 30 kW, and the estimation model 310.

In the above-described embodiment, an example in which the charge mode for the time slot changed to the booking time slot is changed to a standard charge mode, and the charge mode for a time slot changed to the free time slot is changed to a quick charge mode has been described; however, the disclosure is not limited thereto. The charge mode for a time slot changed to the booking time slot may be changed to a quick charge mode, and the charge mode for a time slot changed to the free time slot may be changed to a standard charge mode. The charge mode does not nee to be changed.

Information on a desired amount of electric power charged may be sent from the user of each of the electrified vehicles 10 to the server 100. Information on which one of quick charge and standard charge the electrified vehicle 10 supports may be sent from the user of each of the electrified vehicles 10 to the server 100. The busy status of the EVSEs 21 may be determined by the server 100 based on the pieces of information sent.

The above-described embodiment and the above-described plurality of modifications may be executed in combination with each other.

In the above-described embodiment, an example in which the server 100 and the charging system 20 are provided separately from each other has been described; however, the disclosure is not limited thereto. The charging system 20 may include the server 100 (management apparatus).

The embodiment described above is illustrative and not restrictive in all respects. The scope of the disclosure is not defined by the description of the above-described embodiment, and is defined by the appended claims. The scope of the disclosure is intended to encompass all modifications within the scope of the appended claims and equivalents thereof.

What is claimed is:

1. A management method of managing charging of electrified vehicles with at least one charger, the management method comprising:

adjusting allocation between a booking time slot to book charging with the at least one charger and a free time slot to allow charging with the at least one charger without a booking based on at least one of information on a busy status of the at least one charger, or information on a booking status of the at least one charger;

when the number of the electrified vehicles booked in a predetermined booking period is greater than a predetermined number, increasing allocation of the booking time slot in the predetermined booking period; and controlling the at least one charger such that a charge mode for a charger changed from the free time slot to the booking time slot is set to low-rate charge and a charge mode for a charger changed from the booking time slot to the free time slot is set to quick charge, the quick charge being higher in rate of charge than the low-rate charge.

2. The management method according to claim 1, further comprising:

determining a busy status of the at least one charger after a predetermined period of time based on vehicle information on the electrified vehicles; and adjusting the allocation after the predetermined period of time based on the busy status after the predetermined period of time.

3. The management method according to claim 2, wherein the vehicle information includes information on the number of the electrified vehicles located within a predetermined range with reference to the at least one charger.

4. The management method according to claim 2, wherein the vehicle information includes information on at least one of a state of charge (SOC) or a charging capacity, the SOC and the charging capacity being acquired from each of the electrified vehicles associated with the at least one charger.

5. The management method according to claim 2, further comprising storing a vehicle number estimation model in a memory, wherein:

the vehicle number estimation model is a trained model that uses the vehicle information as an input and that uses the number of the electrified vehicles that use the at least one charger as an output; and the busy status after the predetermined period of time is determined based on the vehicle number estimation model and the vehicle information.

6. The management method according to claim 1, wherein:

the at least one charger includes a plurality of chargers; and the adjusting allocation includes adjusting allocation of the plurality of chargers between the number of chargers for the free time slot and the number of chargers for the booking time slot.

7. The management method according to claim 1, further comprising acquiring, by a communication unit, the information on the busy status of the at least one charger and the information on the booking status of the at least one charger.

8. The management method according to claim 7, wherein the acquiring by the communication unit includes acquiring information on the number of the electrified vehicles in queue by acquiring an image from a camera installed around the at least one charger.

9. A management apparatus that manages charging of electrified vehicles with at least one charger, the management apparatus comprising a processor programmed to perform the management method according to claim 1.

10. A management method of managing charging of electrified vehicles with at least one charger, the management method comprising:

adjusting allocation between a booking time slot to book charging with the at least one charger and a free time slot to allow charging with the at least one charger without a booking based on at least one of information on a busy status of the at least one charger, or information on a booking status of the at least one charger;

when it is determined that the at least one charger is busy in a predetermined period based on the information on the busy status, increasing allocation of the free time slot in the predetermined period; and controlling the at least one charger such that a charge mode for a charger changed from the free time slot to the booking time slot is set to low-rate charge and a charge mode for a charger changed from the booking time slot to the free time slot is set to quick charge, the quick charge being higher in rate of charge than the low-rate charge.

11. The management method according to claim 10, further comprising:

determining a busy status of the at least one charger after a predetermined period of time based on vehicle information on the electrified vehicles; and adjusting the allocation after the predetermined period of time based on the busy status after the predetermined period of time.

12. The management method according to claim 11, wherein the vehicle information includes information on the number of the electrified vehicles located within a predetermined range with reference to the at least one charger.

13. The management method according to claim 11, wherein the vehicle information includes information on at least one of a state of charge (SOC) or a charging capacity, the SOC and the charging capacity being acquired from each of the electrified vehicles associated with the at least one charger.

14. The management method according to claim 11, further comprising storing a vehicle number estimation model in a memory, wherein:

the vehicle number estimation model is a trained model that uses the vehicle information as an input and that uses the number of the electrified vehicles that use the at least one charger as an output; and the busy status after the predetermined period of time is determined based on the vehicle number estimation model and the vehicle information.

15. The management method according to claim 10, wherein:

the at least one charger includes a plurality of chargers; and the adjusting allocation includes adjusting allocation of the plurality of chargers between the number of chargers for the free time slot and the number of chargers for the booking time slot.

16. The management method according to claim 10, further comprising acquiring, by a communication unit, the information on the busy status of the at least one charger and the information on the booking status of the at least one charger.

17. The management method according to claim 16, wherein the acquiring by the communication unit includes acquiring information on the number of the electrified vehicles in queue by acquiring an image from a camera installed around the at least one charger.

18. A management apparatus that manages charging of electrified vehicles with at least one charger, the management apparatus comprising a processor programmed to perform the management method according to claim 10.

19. A management method of managing charging of electrified vehicles with at least one charger, the management method comprising:

adjusting allocation between a booking time slot to book charging with the at least one charger and a free time slot to allow charging with the at least one charger without a booking, wherein information on a busy status of the at least one charger is the number of the electrified vehicles in queue to use the at least one charger;

determining a current busy status of the at least one charger based on the number of the electrified vehicles in queue;

adjusting the current allocation based on the current busy status; and controlling the at least one charger such that a charge mode for a charger changed from the free time slot to the booking time slot is set to low-rate charge and a charge mode for a charger changed from the booking time slot to the free time slot is set to quick charge, the quick charge being higher in rate of charge than the low-rate charge.

20. A management apparatus that manages charging of electrified vehicles with at least one charger, the management apparatus comprising a processor programmed to perform the management method according to claim 19.

* * * * *